(12) United States Patent
Satoh et al.

(10) Patent No.: US 10,178,094 B2
(45) Date of Patent: Jan. 8, 2019

(54) COMMUNICATION SYSTEM AND INFORMATION COLLECTION METHOD EXECUTED IN COMMUNICATION SYSTEM

(71) Applicant: TOYOTA JIDOSHA KABUSHIKI KAISHA, Toyota-shi, Aichi-ken (JP)

(72) Inventors: Yusuke Satoh, Toyota (JP); Serina Egawa, Toyota (JP); Yoshihiko Katoh, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 209 days.

(21) Appl. No.: 15/380,089

(22) Filed: Dec. 15, 2016

(65) Prior Publication Data

US 2017/0180370 A1    Jun. 22, 2017

(30) Foreign Application Priority Data

Dec. 18, 2015 (JP) .................................. 2015-247446
Sep. 29, 2016 (JP) .................................. 2016-191550

(51) Int. Cl.
| | |
|---|---|
| *H04L 29/06* | (2006.01) |
| *G06F 21/56* | (2013.01) |
| *G06F 21/44* | (2013.01) |
| *H04L 29/08* | (2006.01) |

(52) U.S. Cl.
CPC .......... *H04L 63/0876* (2013.01); *G06F 21/44* (2013.01); *G06F 21/565* (2013.01); *G06F 21/566* (2013.01); *H04L 63/12* (2013.01); *H04L 63/1425* (2013.01); *H04L 67/12* (2013.01)

(58) Field of Classification Search
CPC ......... H04L 63/12; G06F 21/565; G06F 21/44
USPC ........................................................... 726/23
See application file for complete search history.

(56) References Cited

U.S. PATENT DOCUMENTS

| | | | |
|---|---|---|---|
| 9,231,936 B1* | 1/2016 | Wang | ....................... H04L 63/08 |
| 9,866,542 B2* | 1/2018 | Baltes | ....................... H04L 63/08 |
| 2005/0044418 A1* | 2/2005 | Miliefsky | ........... H04L 63/0272 726/4 |
| 2010/0017608 A1* | 1/2010 | Larsen | .................... H04L 41/12 713/168 |

(Continued)

FOREIGN PATENT DOCUMENTS

JP    2005-165541 A    6/2005

*Primary Examiner* — Teshome Hailu
(74) *Attorney, Agent, or Firm* — Hunton Andrews Kurth LLP (57) ABSTRACT

An information collection method includes determining whether or not a vehicle satisfies predetermined conditions when a target device receives a test mode start request from an collection device, and when it is determined that the vehicle satisfies the predetermined conditions, starting the test mode. In the test mode, update of a predetermined counter is stopped. The collection device generates a first MAC based on the count value received from the target device and transmits an attack information acquisition request with the first MAC to the target device. If the attack information acquisition request with the first MAC is received from the collection device, the target device generates a second MAC based on the stopped count value, determines that the host device is normal in a case where the first MAC and the second MAC coincide with each other, and transmits the attack information to the collection device.

7 Claims, 10 Drawing Sheets

(56) References Cited

U.S. PATENT DOCUMENTS

| | | | | |
|---|---|---|---|---|
| 2013/0117828 A1* | 5/2013 | Larsen | .................... | H04L 41/12 |
| | | | | 726/5 |
| 2013/0317666 A1* | 11/2013 | Sekiyama | .............. | G07C 5/008 |
| | | | | 701/1 |
| 2014/0114497 A1* | 4/2014 | Miyake | .................... | H04L 9/32 |
| | | | | 701/1 |
| 2015/0033305 A1* | 1/2015 | Shear | ....................... | G06F 21/45 |
| | | | | 726/11 |
| 2016/0219028 A1* | 7/2016 | Baltes | ..................... | H04L 63/08 |
| 2017/0111177 A1* | 4/2017 | Oguma | ................ | G06F 21/575 |
| 2017/0262660 A1* | 9/2017 | Dede | ....................... | G06F 21/44 |
| 2018/0145977 A1* | 5/2018 | Murakami | .............. | H04W 4/40 |

* cited by examiner

COMMUNICATION SYSTEM AND INFORMATION COLLECTION METHOD EXECUTED IN COMMUNICATION SYSTEM

INCORPORATION BY REFERENCE

The disclosure of Japanese Patent Application No. 2015-247446 and 2016-191550 filed on Dec. 18, 2015 and Sep. 29, 2016 including the specification, drawings and abstract is incorporated herein by reference in its entirety.

BACKGROUND

1. Technical Field

The present disclosure relates to a communication system in which a plurality of electronic control devices and an collection device, such as a center device or an external tool, are connected through a network, and an information collection method which is executed in the communication system.

2. Description of Related Art

For example, Japanese Patent Application Publication No. 2005-165541 (JP 2005-165541 A) discloses a technique in which, in a communication system in which electronic control devices (monitoring target system) and a center device (damage analysis device) as an collection device are connected through a network, the center device collects information of electronic control devices attacked with an unauthorized access to analyze a damage situation.

In the communication system disclosed in JP 2005-165541 A, an attack where an electronic control device is damaged by an unauthorized access and an attack where there is an unauthorized access but an electronic control device is not damaged are automatically classified in collecting information.

SUMMARY

However, in the communication system described above, it is not possible to classify an abnormality resulting from an attack with an unauthorized access and an abnormality not resulting from an attack with an unauthorized access. For example, it is considered that an abnormality of a message authentication code is caused based on a security attack, such as an unauthorized access and based on a circuit fault or the like, but it is not possible to classify the attack information stored in the respective abnormalities.

For this reason, the collection device collects all pieces of the attack information from a plurality of electronic control devices without excluding attack information stored in an abnormality of authentication processing due to a circuit fault or the like, resulting in degradation of the analysis accuracy of the attack information by the collection device or the like.

The disclosure provides a communication system and an information collection method capable of, in a communication system in which a plurality of electronic control devices and an collection device are connected through a network, allowing an collection device to collect attack information from a plurality of electronic control devices while excluding attack information stored in an abnormality of authentication processing due to a circuit fault or the like.

A first aspect of the disclosure is an information collection method which is executed in an communication system including a plurality of electronic control devices mounted in a vehicle and configured to perform authentication processing using a count value of a predetermined counter updated in a predetermined manner and to store attack information in an abnormality of the authentication processing, and an collection device provided outside the vehicle and configured to collect attack information of the plurality of electronic control devices. The information collection method includes transmitting a test mode start request from the collection device to a target device subjected to attack information acquisition, the target device being one of the plurality of electronic control devices. When the target device receives the test mode start request from the collection device, determining whether or not the vehicle satisfies predetermined conditions, and when it is determined that the vehicle satisfies the predetermined conditions, allowing the target device to start the test mode. In the test mode, an operation of the counter is stopped, the count value of the stopped counter is transmitted to the collection device, the collection device generates a first message authentication code based on the count value received from the target device and transmits an attack information acquisition request with the first message authentication code to the target device, and if the attack information acquisition request with the first message authentication code is received from the collection device, the target device generates a second message authentication code based on the count value of the stopped counter. The target device determines whether or not the first message authentication code and the second message authentication code coincide with each other, in a case where the first message authentication code and the second message authentication code coincide with each other, the target device determines that the target device is normal, the target device and transmits the attack information to the collection device. In a case where the first message authentication code and the second message authentication code do not coincide with each other, the target device determines that the target device is not normal, and after the attack information is transmitted to the collection device or after it is determined that the target device is not normal, the target device starts the operation of the counter and ends the test mode.

In the first aspect, in the predetermined test mode, the count value of the predetermined counter provided on the electronic control device side is transmitted from the target device to the collection device, such as a center device or an external tool. Then, both of the collection device and the target device respectively generate the message authentication codes from the same count value, and the target device determines the coincidence/non-coincidence of both of the message authentication codes to determine the possibility of transmission of the attack information to the collection device.

In this way, the message authentication codes respectively generated from the same count value are compared, and if the message authentication code of the target device does not coincide with the correct message authentication code generated by the collection device, it is possible to determine that the message authentication code of the target device is abnormal. Accordingly, in this case, since the attack information stored in the target device is likely to be attack information stored in an abnormality of authentication processing due to a circuit fault or the like, the attack information is not transmitted to the collection device. Only in a case where both of the message authentication codes coincide with each other, the attack information stored in the target device is transmitted to the collection device. With this, it is possible to exclude attack information stored in an abnormality of authentication processing due to a circuit fault or the like, and to improve the analysis accuracy of the attack information by the center device or the like.

In the first aspect, the target device may perform control such that the vehicle in which the target device is mounted is unable to travel in a period from the start to the end of the test mode.

According to the above-described aspect, in addition, it is possible to prevent a vehicle under a situation of weak security, for example, due to stopping of the counter from moving (traveling) outside a safe place and being exposed to a risk of a security attack.

In the first aspect, when it is determined that the vehicle does not satisfy the predetermined conditions before the test mode ends, the target device may start the operation of the counter at the time of the determination and may end the test mode.

According to the above-described aspect, in addition, it is possible to prevent a vehicle under a situation of weak security, for example, due to stopping of the counter from being exposed to a risk of a security attack under a situation of weak security even if the vehicle moves (travels) outside a safe place.

A second aspect of the disclosure provides a communication system including a plurality of electronic control devices mounted in a vehicle and configured to perform authentication processing using a count value of a predetermined counter updated as occasion demands and to store attack information in an abnormality of the authentication processing, and an collection device provided outside the vehicle and configured to collect attack information of the plurality of electronic control devices. The collection device is configured to transmit a test mode start request to a target device subjected to attack information acquisition, the target device being the one of the plurality of electronic control devices. The target device is configured to determine whether or not the vehicle satisfies predetermined conditions when the test mode start request is received from the collection device, and if it is determined that the vehicle satisfies the predetermined conditions, to start the test mode to stop an operation of the counter, and to transmit the count value of the stopped counter to the collection device. The collection device is configured to generate a first message authentication code based on the count value received from the target device and to transmit an attack information acquisition request with the first message authentication code to the target device. The target device is configured to generate a second message authentication code based on the count value of the stopped counter if the attack information acquisition request with the first message authentication code is received from the collection device and to determine whether or not the first message authentication code and the second message authentication code coincide with each other. The target device is configured such that, in a case where the first message authentication code and the second message authentication code coincide with each other, to the target device determines that the target device is normal, the target device transmits the attack information to the collection device, and to the target device starts the operation of the counter to end the test mode, and the target device is configured such that, in a case where the first message authentication code and the second message authentication code do not coincide with each other, to the target device determines that the target device is not normal and the target device starts the operation of the counter to end the test mode.

As described above, according to the information collection method of the disclosure, in the communication system in which a plurality of electronic control devices and the collection device are connected through the network, the collection device can collect the attack information from a plurality of electronic control devices while excluding attack information stored in an abnormality of the authentication processing due to a circuit fault or the like.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The disclosure is a communication system in which attack information stored in a plurality of electronic control devices is collected by an collection device, such as an center device or an external tool. In the communication system, the collection device and the electronic control device respectively generate message authentication codes based on same data. In a case where the message authentication code generated by the collection device is correct, if both of the message authentication codes do not coincide with each other, it can be determined that a message authentication code generation function of the electronic control device is faulty. Accordingly, the electronic control device determined to be faulty does not transmit attack information to the collection device. With this, the collection device can exclude attack information stored in an abnormality of authentication processing due to a circuit fault or the like from the attack information collected from a plurality of electronic control devices.

Hereinafter, an information collection method of the disclosure will be described in detail referring to the drawings in connection with a case where the information collection method is applied to a communication system for a vehicle as an example.

Configuration Example of Communication System

Figure 1:
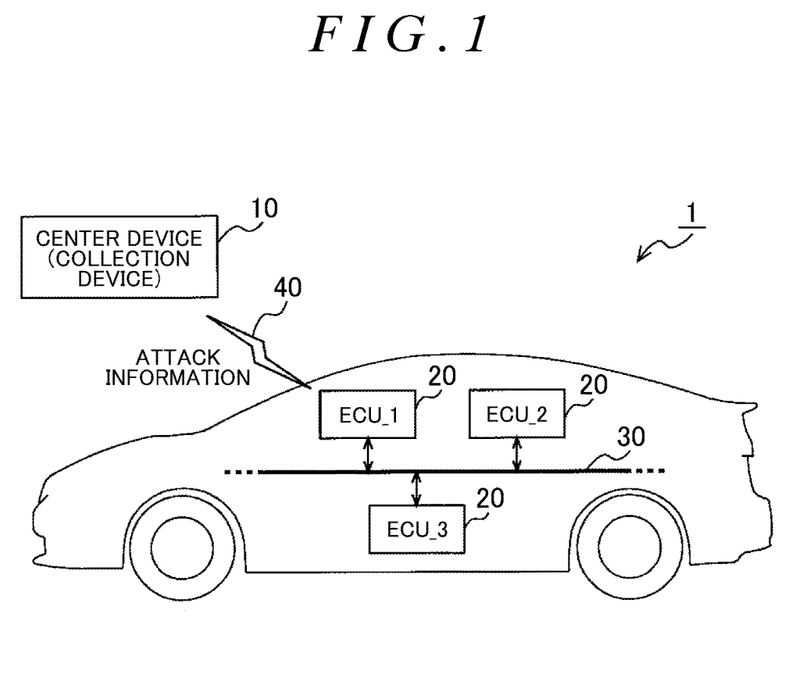
FIG. 1 is a diagram showing a configuration example of a communication system to which an information collection method according to each embodiment is applied.

FIG. 1 is a diagram showing a configuration example of a communication system 1 to which an information collection method according to each embodiment of the disclosure is applied. The communication system 1 illustrated in FIG. 1 is constituted of a center device 10 provided outside a vehicle and a plurality of electronic control devices 20 (ECU_1, ECU_2, ECU_3) mounted in the vehicle.

A plurality of electronic control devices 20 are connected to be communicable through an in-vehicle network 30, such as a controller area network (CAN). The center device 10 is connected to be communicable with at least one electronic control device 20 (ECU_1), for example, through a wireless network 40. The electronic control devices 20 (ECU_2, ECU_3) which are not connected to be directly communicable with the center device 10 perform communication with the center device 10 by way of the in-vehicle network 30, the electronic control device 20 (ECU_1) connected to be communicable with the center device 10, and the wireless network 40.

Figure 2:
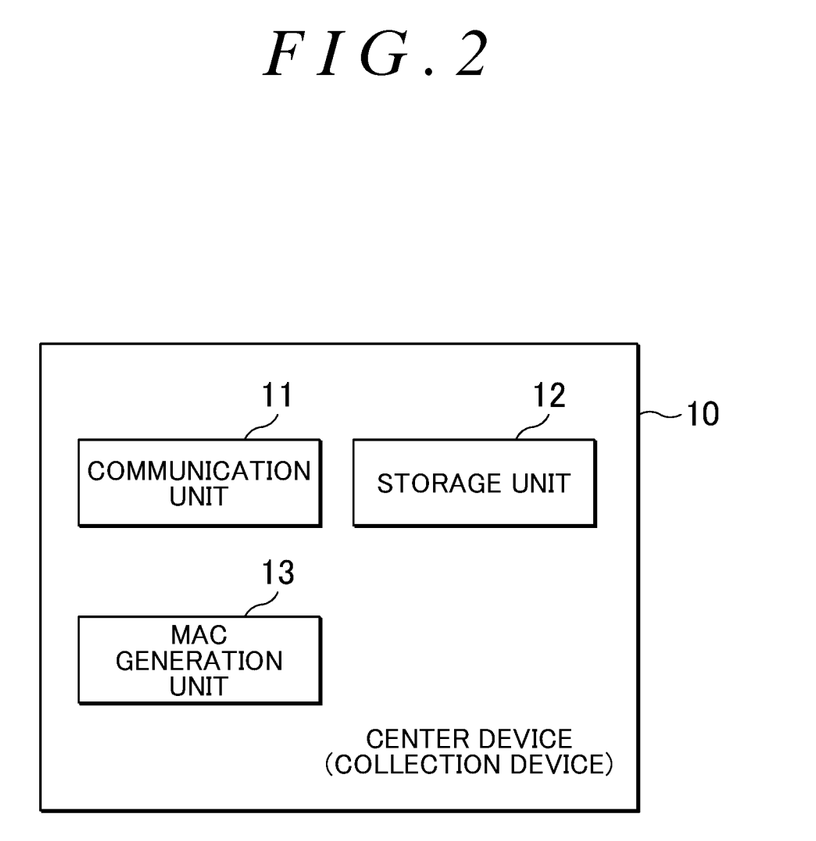
FIG. 2 is a diagram showing a configuration example of a center device (collection device)

The center device 10 is an collection device which collects attack information from a plurality of electronic control devices 20 mounted in the vehicle. The center device 10 can analyze the collected attack information. As shown in FIG. 2, the center device 10 includes a communication unit 11, a storage unit 12, and an MAC generation unit 13.

The communication unit 11 transmits a test mode start request or an attack information acquisition request with a message authentication code to a target electronic control device 20, or receives a count value of a synchronous or attack information from the target electronic control device 20. The test mode, the message authentication code, the count value, and the attack information will be described below. The storage unit 12 stores the attack information received from various electronic control devices 20.

The MAC generation unit 13 generates a message authentication code (first MAC) using the count value received from the target electronic control device 20. Since this embodiment is based on a premise that the communication unit 11 receives a correct count value from the target electronic control device 20, the message authentication code (first MAC) generated by the MAC generation unit 13 becomes a regular message authentication code. The message authentication code (first MAC) is attached to the attack information acquisition request and is transmitted from the communication unit 11 to the target electronic control device 20.

The center device 10 typically includes a central processing unit (CPU), a memory, an input/output interface, and the like, and the CPU reads, interprets, and executes a program stored in the memory, thereby realizing the respective functions of the communication unit 11, the storage unit 12, and the MAC generation unit 13 described above.

Figure 3:
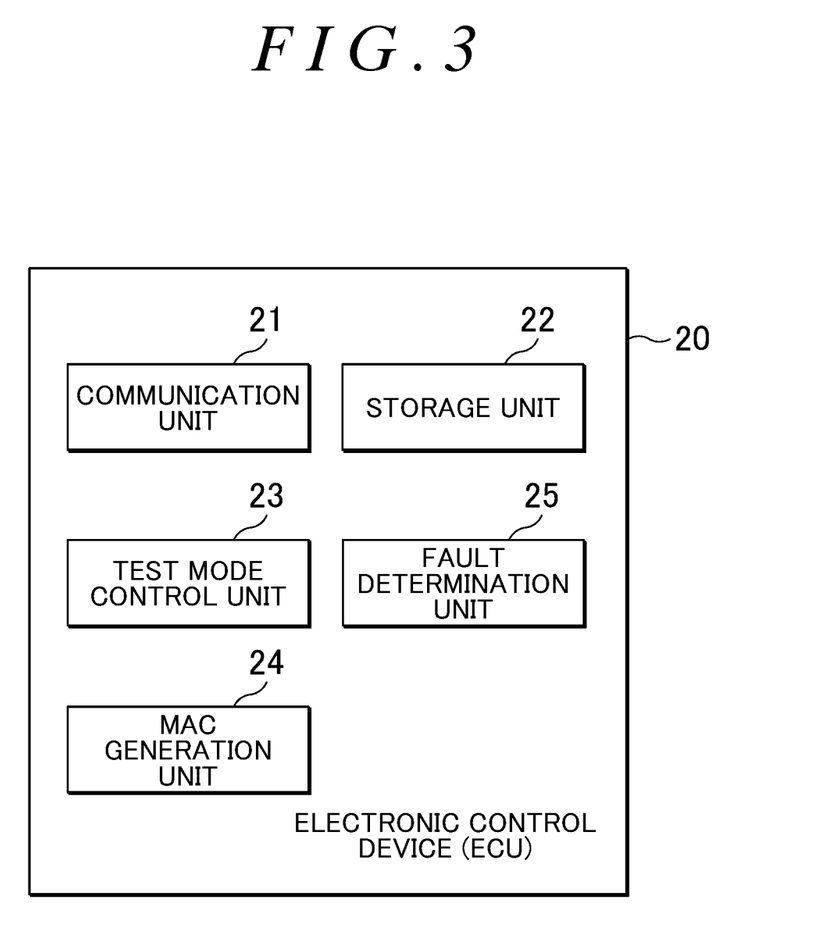
FIG. 3 is a diagram showing a configuration example of an electronic control device (ECU)

The electronic control device 20 perform message authentication processing using the count value of the synchronous counter, and stores attack information (for example, a log indicating when, whence, and what kind of an attack is received) in an abnormality of the authentication processing. In addition, the electronic control device 20 performs test mode transition processing, device fault determination processing, and attack information transmission processing in response to a request from the center device 10 provided outside the vehicle. As shown in FIG. 3, the electronic control device 20 includes a communication unit 21, a storage unit 22, a test mode control unit 23, an MAC generation unit 24, and a fault determination unit 25.

The communication unit 21 receives the test mode start request or the attack information acquisition request from the center device 10, or transmits the count value of the synchronous counter or the attack information to the center device 10. The electronic control device 20 which receives the test mode start request becomes the target electronic control device 20. The synchronous counter is an internal counter of the vehicle which is used to secure the security of the in-vehicle network, and performs an update operation based on the standard specification (automotive open system architecture (AUTOSAR)) as occasion demands. The storage unit 22 stores "attack information" which is information stored in an abnormality of the authentication processing due to a security attack, such as an unauthorized access, received by the electronic control device 20.

The test mode control unit 23 receives the test mode start request from the center device 10 and controls the transition to the test mode. The test mode is a mode for providing the count value of the synchronous counter in the vehicle unknowable by a device outside the vehicle from the target electronic control device 20 to the center device 10. In the test mode, since the synchronous counter important to secure security is stopped to acquire the count value at this time, new vulnerability may occur. Accordingly, in one embodiment of the disclosure, the test mode control unit 23 performs determination to enable the start of the test mode (transition to the test mode) only in a case where the vehicle is under a vehicle situation determined in advance for securing security, in other words, only in a case where the vehicle satisfies predetermined conditions. In other embodiments, even if the test mode starts, if the vehicle does not satisfy the predetermined conditions, the test mode control unit 23 ends the test mode halfway.

The vehicle situation (predetermined conditions) determined in advance refers to a situation in which security is estimated to be high, and for example, a situation in which the vehicle enters a maintenance facility of a dealer and is stopped, or the like is considered. In this way, in a case of a high security situation in which the vehicle enters the maintenance facility and is stopped, the test mode control unit 23 regards that the vehicle satisfies the predetermined conditions and starts the test mode. That is, the electronic control device 20 transitions to the test mode. Accordingly, in addition, in other embodiments, after the test mode is started, the test mode control unit 23 performs control such that the vehicle in which the host device is mounted is unable to travel. The control for making the vehicle unable to travel can be realized, for example, by inhibiting engine start or inhibiting brake release using the electronic control device 20, such as an immobilizer ECU, an engine ECU, or a brake ECU.

The vehicle entering the maintenance facility of the dealer can be determined, for example, based on host vehicle position information obtained from a global positioning system (GPS) receiver. The vehicle being stopped can be determined, for example, based on vehicle speed information or shift position information obtained from various sensors.

The MAC generation unit 24 generates a message authentication code (second MAC) using the count value of the synchronous counter stopped by the test mode control unit 23. The fault determination unit 25 determines coincidence/non-coincidence of the regular message authentication code (first MAC) attached to the attack information acquisition request received by the communication unit 21 from the center device 10 and the message authentication code (second MAC) generated by the MAC generation unit 24. Then, the fault determination unit 25 determines that the host electronic control device 20 is normal if both of the message authentication codes coincide with each other (first MAC=second MAC), and determines that the host electronic control device 20 is faulty if both of the message authentication codes do not coincide with each other (first MAC≠second MAC).

In this embodiment, a target subjected to fault determination is a function (circuit) relating to encryption corresponding to the MAC generation unit 24, or the like. Accordingly, the regular message authentication code (first MAC) on the center device 10 side and the message authentication code (second MAC) on the target electronic control device 20 which are generated based on the same count value do not coincide with each other, the fault determination unit 25 can determine that the target electronic control device 20 is faulty.

In a case where it is determined that the target electronic control device 20 is faulty, the fault determination unit 25 determines that the attack information stored in the storage unit 22 is erroneous information stored in an abnormality of the authentication processing due to a circuit fault or the like, and does not transmit the attack information to the center device 10. In contrast, in a case where it is determined that the target electronic control device 20 is normal, the fault determination unit 25 determines that the attack information stored in the storage unit 22 is correct information stored in an abnormality of the authentication processing due to a security attack, such as an unauthorized access, and transmits the attack information to the center device 10 through the communication unit 21.

The electronic control device 20 typically includes a central processing unit (CPU), a memory, an input/output interface, and the like, and the CPU reads, interprets, and executes a program stored in the memory, thereby realizing the respective functions of the communication unit 21, the storage unit 22, the test mode control unit 23, the MAC generation unit 24, and the fault determination unit 25 described above.

Information Collection Method Executed in Communication System

Figure 4A:
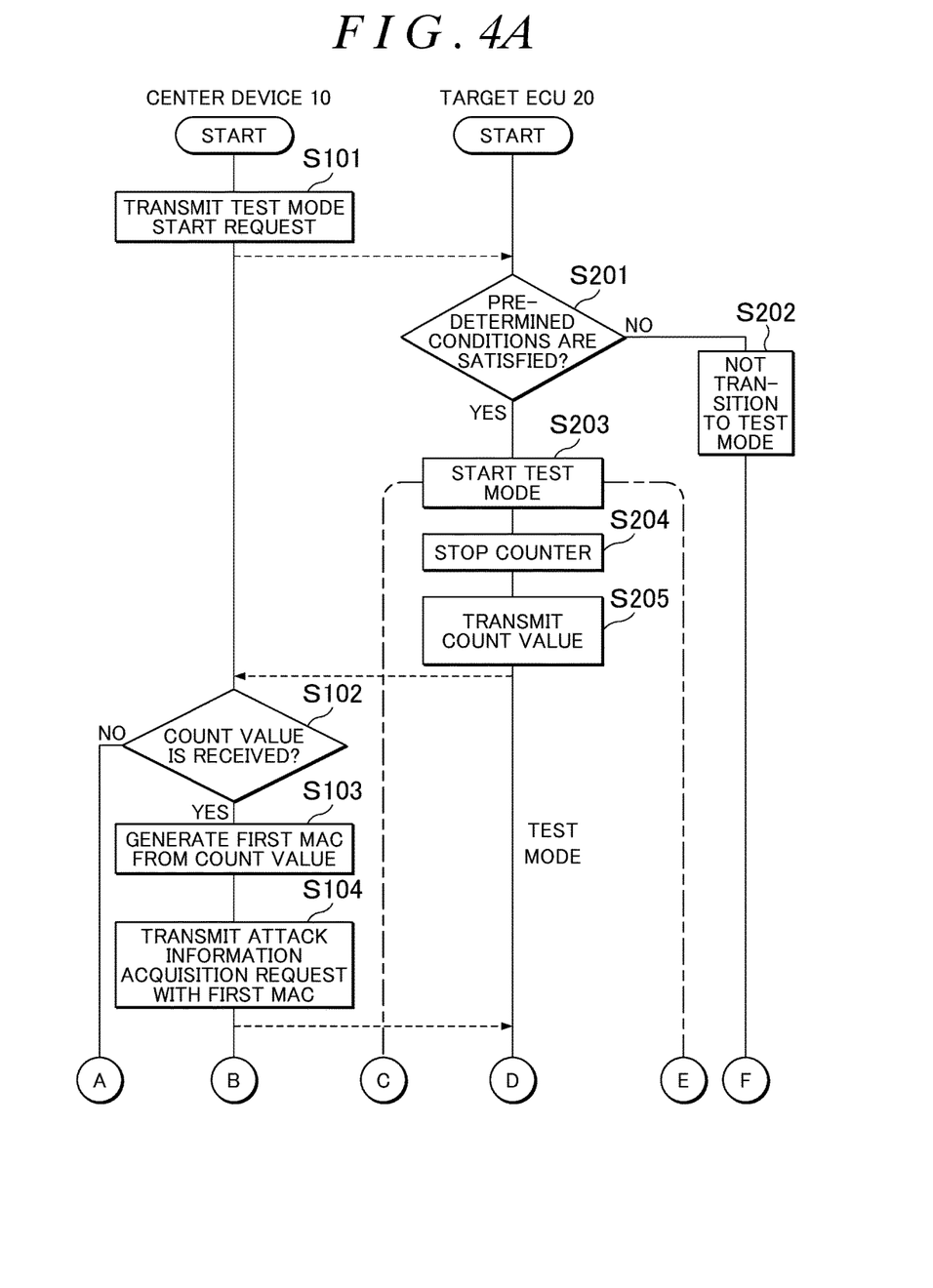
FIG. 4A is a flowchart showing a processing procedure of the information collection method according to a first embodiment.
Figure 4B:
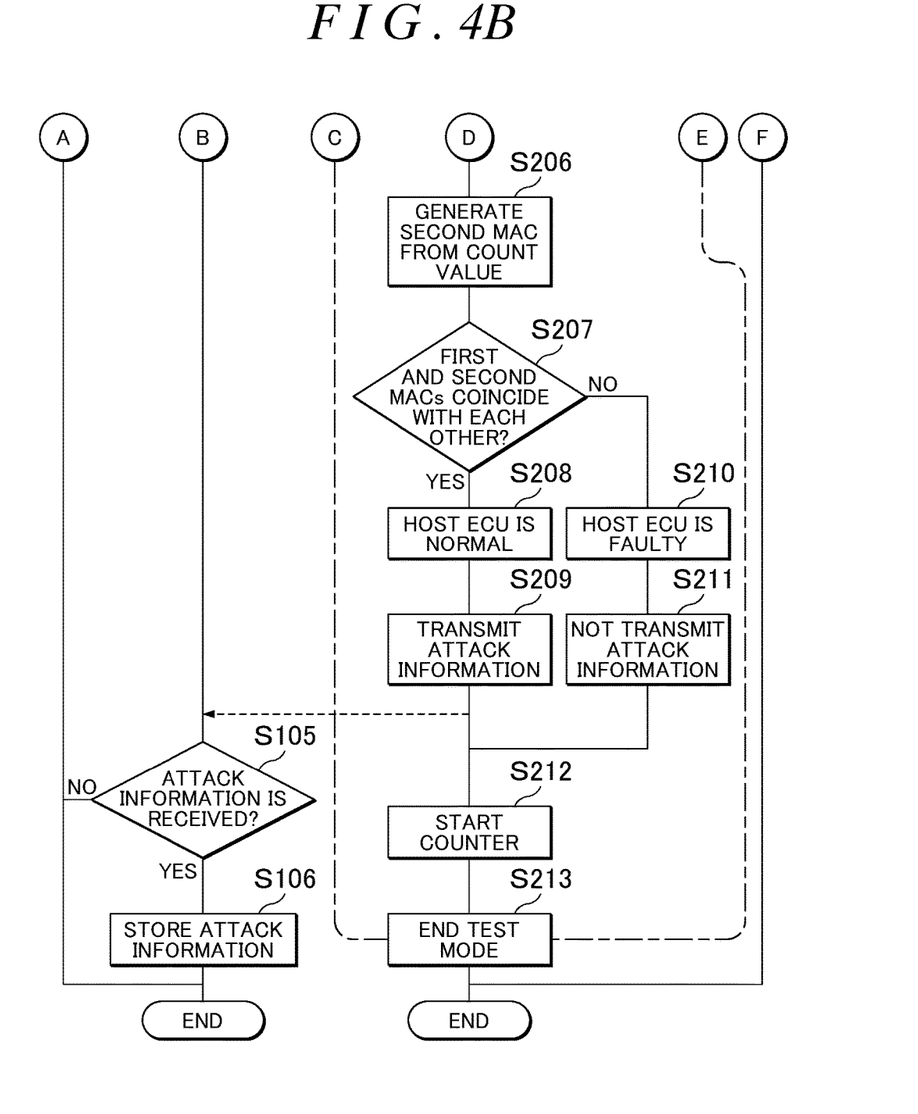
FIG. 4B is a flowchart showing a processing procedure of the information collection method according to a first embodiment.
Figure 5A:
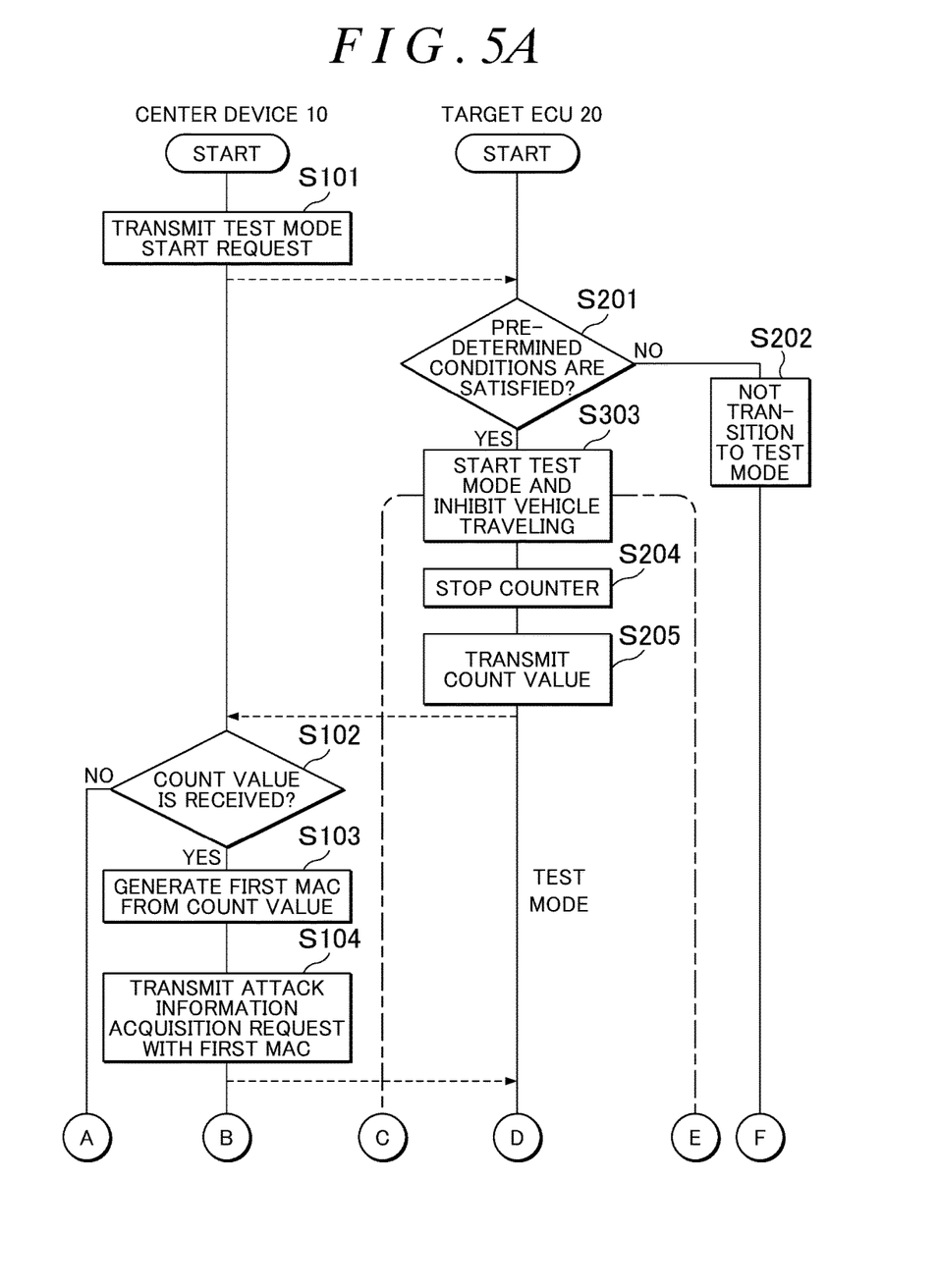
FIG. 5A is a flowchart showing a processing procedure of the information collection method according to a second embodiment.
Figure 5B:
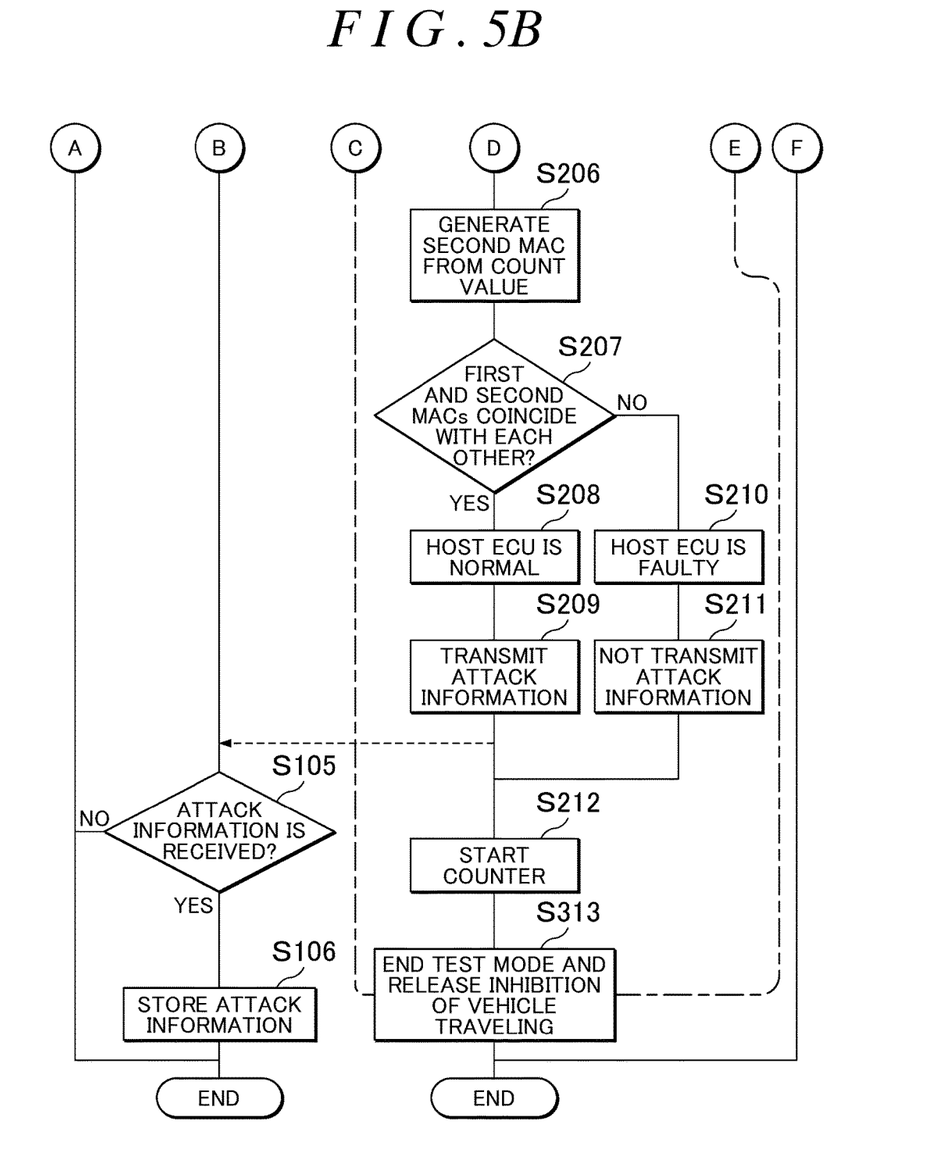
FIG. 5B is a flowchart showing a processing procedure of the information collection method according to a second embodiment.
Figure 6A:
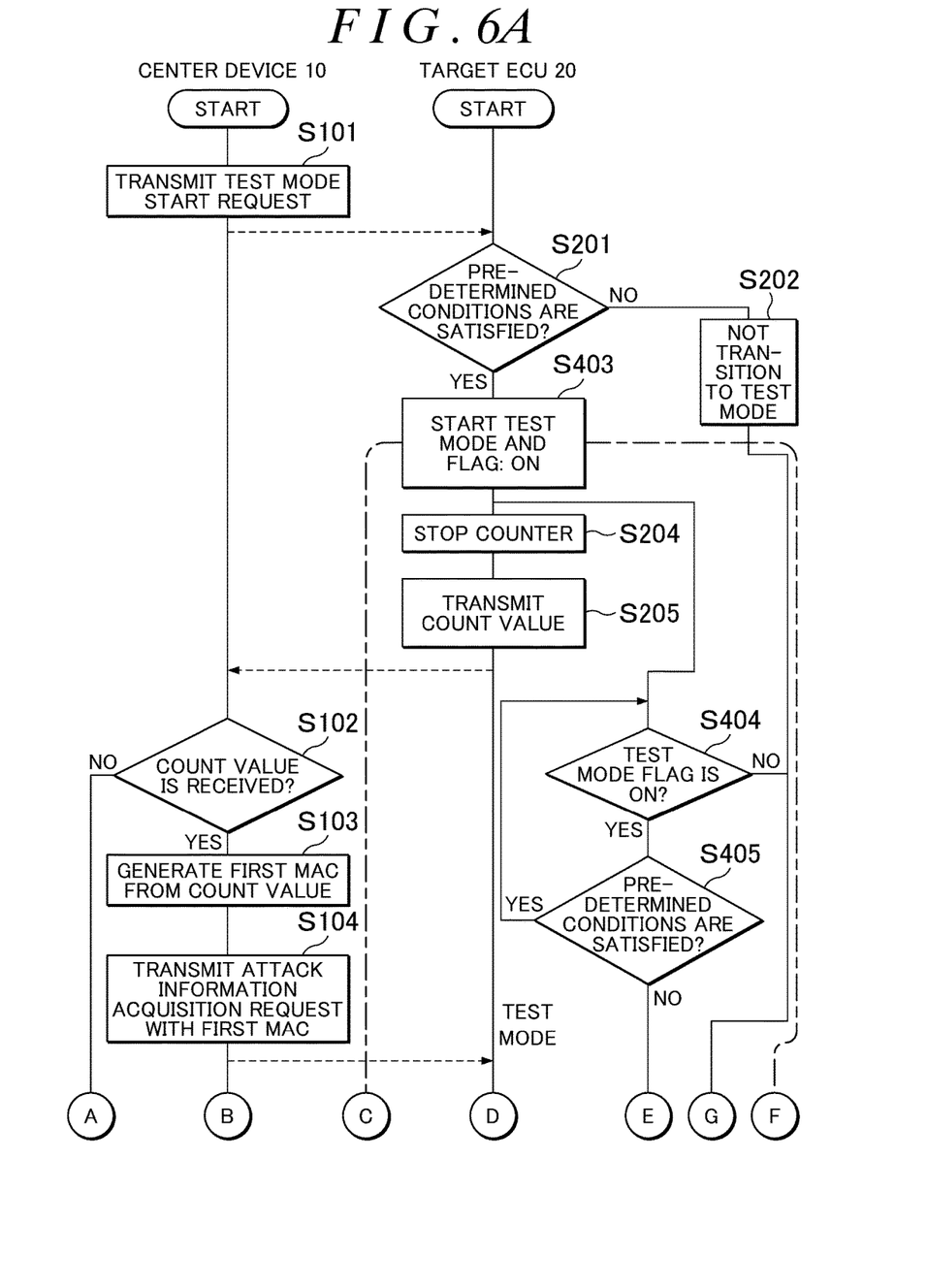
FIG. 6A is a flowchart showing a processing procedure of the information collection method according to a third embodiment.
Figure 6B:
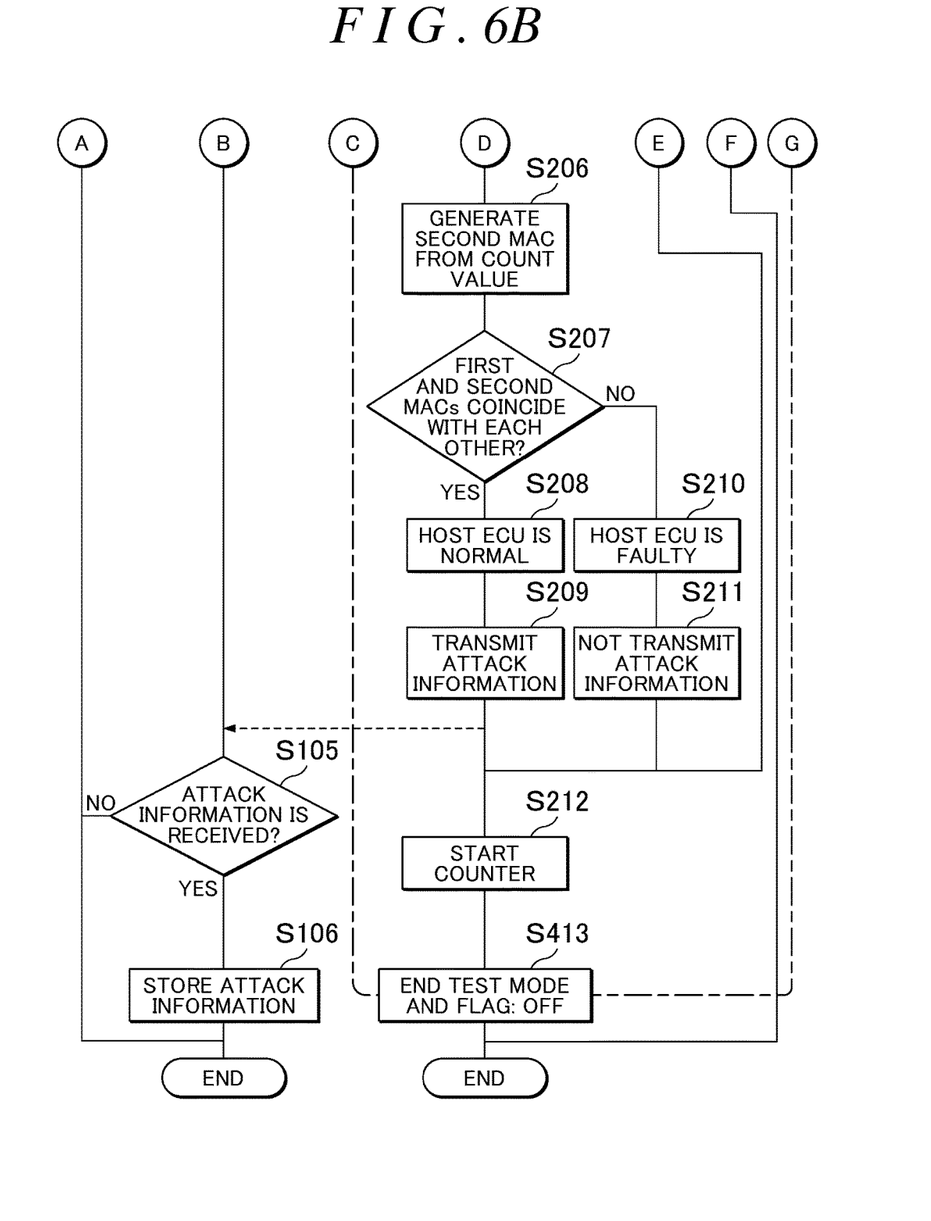
FIG. 6B is a flowchart showing a processing procedure of the information collection method according to a third embodiment.

The information collection method which is executed by the center device 10 and the target electronic control device 20 in the communication system 1 described above will be described further referring to FIGS. 4A to 6B. FIG. 4A and FIG. 4B are flowchart showing a processing procedure of an information collection method according to a first embodiment of the disclosure. FIG. 5A and FIG. 5B are flowchart showing a processing procedure of an information collection method according to a second embodiment of the disclosure. FIG. 6 A and FIG. 6B are flowchart showing a processing procedure of an information collection method according to a third embodiment of the disclosure.

First Embodiment

Referring to FIGS. 4A and 4B, an information collection method according to a first embodiment will be described. In FIGS. 4A and 4B, the center device 10 transmits the test mode start request to the target electronic control device (ECU) 20 subjected to attack information acquisition (S101).

The target electronic control device 20 which receives the test mode start request from the center device 10 determines whether or not the vehicle satisfies the predetermined conditions based on the current situation of the vehicle, and determines whether or not transitioning to the test mode is possible (S201). The predetermined conditions are that the vehicle is, for example, at a specific place, such as the maintenance facility of the dealer, where it is supposed to be safe with high security, the vehicle is stopped, and the like. The vehicle being at the specific place can be determined based on positional information of the GPS, or the like, and the vehicle being stopped can be determined based on vehicle speed information, shift position information, or the like. In the above-described determination, in a case where the vehicle does not satisfy the predetermined conditions and transitioning to the test mode is impossible (S201: No), the target electronic control device 20 does not transition to the test mode (S202), and ends the processing for the request from the center device 10.

In the above-described determination, in a case where the vehicle satisfies the predetermined conditions and transitioning to the test mode is possible (S201: Yes), the target electronic control device 20 transitions to the test mode and starts the processing (S203). If the processing starts, the target electronic control device 20 first stops the synchronous counter in the vehicle (S204). The target electronic control device 20 transmits the count value indicated by the stopped synchronous counter to the center device 10 (S205).

The center device 10 determines whether or not the count value as a response to the test mode start request is received from the target electronic control device 20 (S102). In a case where the count value cannot be received from the target electronic control device 20 (S102: No), the center device 10 ends the processing without acquiring the attack information from the target electronic control device 20.

In a case where the count value is received from the target electronic control device 20 (S102: Yes), the center device 10 generates the regular message authentication code (first MAC) using the received count value (S103). Then, the center device 10 transmits the attack information acquisition request with the generated regular message authentication code (first MAC) to the target electronic control device 20 (S104).

The target electronic control device 20 which receives the attack information acquisition request with the regular message authentication code (first MAC) from the center device 10 generates the message authentication code (second MAC) using the count value indicated by the stopped synchronous counter (S206). Then, the target electronic control device 20 determines whether or not the regular message authentication code (first MAC) received from the center device 10 and the generated message authentication code (second MAC) coincide with each other (S207).

In a case where it is determined that both of the message authentication codes (first MAC and second MAC) do not coincide with each other (S207: No), the target electronic control device 20 determines that the (message authentication code generation function of the) target electronic control device 20 is faulty (S210). In this case, the target electronic control device 20 determines that the attack information stored in the storage unit 22 is erroneous information stored in an abnormality of the authentication processing due to a fault in the MAC generation unit 24, or the like and does not transmit the attack information to the center device 10 (S211).

In a case where it is determined that both of the message authentication codes (first MAC and second MAC) coincide with each other (S207: Yes), the target electronic control device 20 determines that the (message authentication code generation function of the) target electronic control device 20 is normal (S208). In this case, the target electronic control device 20 determines that the attack information stored in the storage unit 22 is correct information stored in an abnormality of the authentication processing due to a security attack, such as an unauthorized access and transmits the attack information to the center device 10 (S209).

The center device 10 determines whether or not the attack information as a response to the attack information acquisition request is received from the target electronic control device 20 (S105). In a case where the attack information cannot be received from the target electronic control device 20 (S105: No), the center device 10 ends the processing without acquiring the attack information from the target electronic control device 20. In a case where the attack information is received from the target electronic control device 20 (S105: Yes), the center device 10 stores the attack information in the storage unit 12 (S106). The attack information stored in the storage unit 12 is collected along with other pieces of the attack information previously received and is used in analysis or the like.

After the transmission (S209) or non-transmission (S211) of the attack information to the center device 10 is executed, the target electronic control device 20 restarts the stopped synchronous counter in the vehicle (S212), and ends the test mode (S213). The restart of the synchronous counter may be performed according to the determination of the target electronic control device 20, or may be performed in response to a predetermined reply from the center device 10.

Second Embodiment

Referring to FIGS. 5A and 5B, an information collection method according to a second embodiment will be described. The information collection method according to the second embodiment includes processing of S303 and S313 which are executed by the target electronic control device 20, in contrast to the information collection method according to the first embodiment described above. Accordingly, in the information collection method according to the second embodiment, description will be provided focusing on different processing. The same kinds of processing as those of the information collection method according to the first embodiment described above are represented by the same reference numerals, and description thereof will not be repeated.

In a case where it is determined that the vehicle satisfies the predetermined conditions and transitioning to the test mode is possible (S201: Yes), the target electronic control device 20 transitions to the test mode to start the processing and performs predetermined control such that the vehicle in which the host device is mounted is unable to travel (S303). For the predetermined control for making the vehicle unable to travel, known means described above can be used.

The target electronic control device 20 executes the test mode, performs the transmission (S209) or non-transmission (S211) of the attack information to the center device 10, and then, restarts the stopped synchronous counter in the vehicle (S212). Then, the target electronic control device 20 ends the test mode and releases the predetermined control for making the vehicle unable to travel (S313).

That is, in the information collection method according to the second embodiment, the vehicle is made unable to travel in a period from when the test mode starts (S303) until the test mode ends (S313) (while processing surrounded by a one-dot-chain line of FIGS. 5A and 5B is performed).

Third Embodiment

Referring to FIGS. 6A and 6B, an information collection method according to a third embodiment will be described. The information collection method according to the third embodiment includes processing of S403 to S405 and S413 which are executed by the target electronic control device 20, in contrast to the information collection method according to the first embodiment described above. Accordingly, in the information collection method according to the third embodiment, description will be provided focusing on different processing. The same kinds of processing as those of the information collection method according to the first embodiment described above are represented by the same reference numerals, and description thereof will not be repeated.

In a case where it is determined that the vehicle satisfies the predetermined conditions and transitioning to the test mode is possible (S201: Yes), the target electronic control device 20 transitions to the test mode to start the processing and sets a predetermined flag (hereinafter, referred to as "test mode flag") indicating the execution of the test mode to "ON" (S403). If the test mode flag is set to "ON", second processing of S404 and S405 is executed in parallel with first processing of S204 to S211 described above which is executed in the test mode.

In the first processing, the test mode is executed, the transmission (S209) or non-transmission (S211) of the attack information to the center device 10 is performed, and then, the stopped synchronous counter in the vehicle is restarted (S212). Then, the target electronic control device 20 sets the test mode flag to "OFF" and ends the test mode (S413).

In the second processing, the target electronic control device 20 determines whether or not the vehicle continues to satisfy the predetermined conditions satisfied when it is determined that transitioning to the test mode is possible, that is, whether or not the vehicle satisfies the predetermined conditions (S405). The determination is performed, for example, regularly at a predetermined interval in a period during which the test mode is executed and the test mode flag is "ON" (S404: Yes).

In the above-described determination, in a case where it is determined that the vehicle does not satisfy the predetermined conditions (S405: No), the target electronic control device 20 restarts the stopped synchronous counter in the vehicle (S212), and sets the test mode flag to "OFF" to end the test mode (S413). The target electronic control device 20 determines that the test mode ends correctly in a case where the test mode flag is turned "OFF" while the vehicle continues to satisfy the predetermined conditions (S404: No), and ends the processing.

That is, in the information collection method according to the third embodiment, it is determined (S404, S405) whether or not the vehicle satisfies the predetermined conditions in parallel with the execution (S204 to S211) of the test mode in a period (while processing surrounded by a one-dot-chain line of FIGS. 6A and 6B is performed) from when the test mode starts (S403) until the test mode ends (S413). Then, if the vehicle does not satisfy the predetermined conditions, the test mode forcibly ends readily even in any execution state of the test mode.

Operation and Effects of Embodiments

As described above, in the information collection method according to the first embodiment of the disclosure, the test mode is provided in which the count value of the synchronous counter in the vehicle unknowable by a device outside the vehicle is provided from the target electronic control device 20 to the center device 10 as an collection device. Then, the center device 10 generates the message authentication code (first MAC) based on the count value provided from the target electronic control device 20, the target electronic control device 20 also generates the message authentication code (second MAC) based on the count value, the coincidence/non-coincidence of both of the message authentication codes is determined, and the possibility of transmission of the attack information to the center device 10 is determined.

In this way, comparison of the message authentication codes respectively generated from the same count value is performed, and if both of the message authentication codes do not coincide with each other, it can be determined that the message authentication code generation function of the target electronic control device 20 is faulty. Accordingly, in this case, the attack information stored in the storage unit 22 of the target electronic control device 20 is likely to be information stored in an abnormality of the authentication processing due to a circuit fault or the like of the MAC generation unit 24. Therefore, such attack information is not transmitted to the center device 10, whereby it is possible to exclude the attack information stored in an abnormality of the authentication processing due to a circuit fault or the like, and the analysis accuracy of the attack information by the center device 10 or the like is improved.

Transitioning to the test mode is possible only in a case where the vehicle is under a vehicle situation determined in advance for securing security. With this, the center device 10 can collect the attack information while maintaining high security of the vehicle.

In the information collection method according to the second embodiment of the disclosure, control is performed such that the vehicle is made unable to travel in a period from the start to the end of the test mode. With this control, it is possible to prevent a vehicle in the test mode, in which the synchronous counter is stopped and security is weak, from moving (traveling) outside a safe dealer maintenance facility and being exposed to a risk of a security attack.

In the information collection method according to the third embodiment of the disclosure, in a case where the vehicle does not satisfy the predetermined conditions, which are satisfied when the test mode start request is received from the center device 10 as an collection device, after the test mode starts and before the test mode ends, the test mode forcibly ends. With this control, even if the vehicle in the test mode, in which the synchronous counter is stopped and security is weak, moves (travels) outside the dealer maintenance facility, it is possible to prevent the vehicle from being exposed to a risk of a security attack under a situation of weak security.

Modification Example

Figure 7:
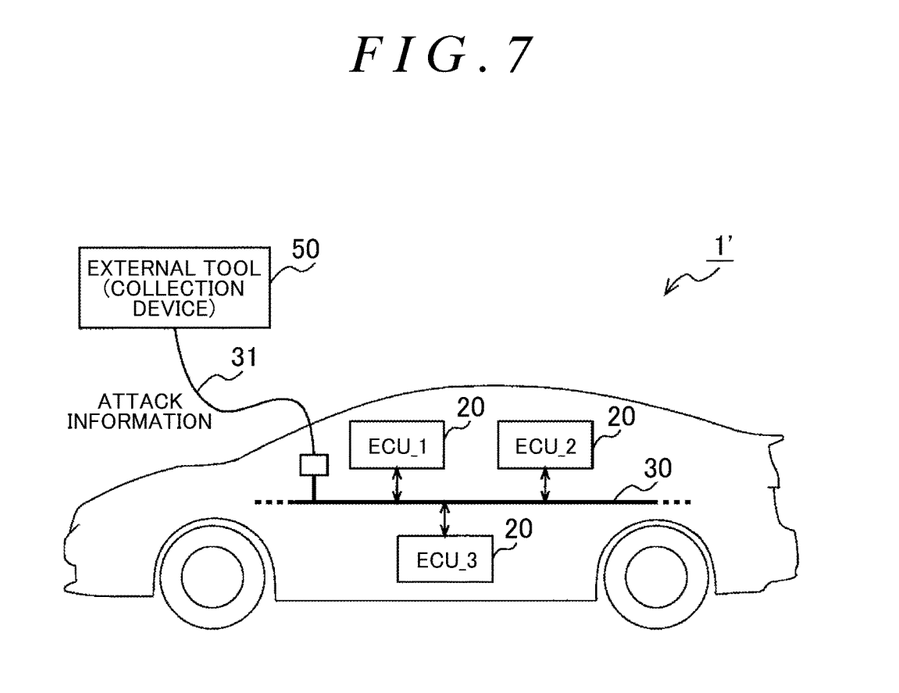
FIG. 7 is a diagram showing another configuration example of a communication system to which the information collection method according to each embodiment is applied.

In the respective embodiments described above, the center device 10 has been described as an collection device which collects the attack information from a plurality of electronic control devices 20. However, the collection device may be, for example, an external tool 50, such as a service tool, which is used by a mechanic of the dealer. The external tool 50 may be connected to be communicable with at least one electronic control device 20 through the wireless network 40 like the center device 10 shown in FIGS. 1 and 2. Furthermore, as in a communication system 1' shown in FIG. 7, the external tool 50 may be connected to be communicable with at least one electronic control device 20 through connection to the in-vehicle network 30 through a connector cable 31 or the like in a wired manner.

The disclosure is usable in a communication system in which a plurality of electronic control devices are connected to an collection device, such as a center device or an external tool, through a network, and is useful for excluding, out of attack information collected from a plurality of electronic control devices by the collection device, attack information stored when authentication processing is abnormal due to a circuit fault or the like.

What is claimed is:

1. An information collection method which is executed in an communication system including a plurality of electronic control devices mounted in a vehicle and configured to perform authentication processing using a count value of a predetermined counter updated in a predetermined manner and to store attack information in an abnormality of the authentication processing, and an collection device provided outside the vehicle and configured to collect attack information of the plurality of electronic control devices, the information collection method comprising:

transmitting a test mode start request from the collection device to a target device subjected to attack information acquisition, the target device being one of the plurality of electronic control devices;

when the target device receives the test mode start request from the collection device, determining whether or not the vehicle satisfies predetermined conditions; and when it is determined that the vehicle satisfies the predetermined conditions, allowing the target device to start the test mode, wherein, in the test mode, an operation of the counter is stopped, the count value of the stopped counter is transmitted to the collection device, the collection device generates a first message authentication code based on the count value received from the target device, and transmits an attack information acquisition request with the first message authentication code to the target device, if the attack information acquisition request with the first message authentication code is received from the collection device, the target device generates a second message authentication code based on the count value of the stopped counter, the target device determines whether or not the first message authentication code and the second message authentication code coincide with each other, in a case where the first message authentication code and the second message authentication code coincide with each other, determines that the target device is normal, and the target device transmits the attack information to the collection device, and in a case where the first message authentication code and the second message authentication code do not coincide with each other, the target device determines that the target device is not normal, and after the attack information is transmitted to the collection device or after it is determined that the target device is not normal, starts the operation of the counter and ends the test mode.

2. The information collection method according to claim 1, wherein the target device performs control such that the vehicle in which the target device is mounted is unable to travel in a period from the start to the end of the test mode.

3. The information collection method according to claim 2, wherein the control for making the vehicle unable to travel is performed by inhibiting engine start or inhibiting brake release.

4. The information collection method according to claim 1, wherein, when it is determined that the vehicle does not satisfy the predetermined conditions after the test mode starts and before the test mode ends, the target device starts the operation of the counter at the time of the determination and ends the test mode.

5. The information collection method according to claim 1, wherein the predetermined conditions are that security is high to be safe.

6. The information collection method according to claim 1, wherein the predetermined conditions are that the vehicle is stopped at a specific place.

7. A communication system comprising:
a plurality of electronic control devices mounted in a vehicle and configured to perform authentication processing using a count value of a predetermined counter updated in a predetermined manner and to store attack information in an abnormality of the authentication processing; and
an collection device provided outside the vehicle and configured to collect attack information of the plurality of electronic control devices,
wherein the collection device is configured to transmit a test mode start request to a target device subjected to attack information acquisition, the target device being one of the plurality of electronic control devices,
the target device is configured to determine whether or not the vehicle satisfies predetermined conditions when the test mode start request is received from the collection device, and when it is determined that the vehicle satisfies the predetermined conditions, to start the test mode to stop the operation of the counter, and to transmit the count value of the stopped counter to the collection device,
the collection device is configured to generate a first message authentication code based on the count value received from the target device and to transmit an attack information acquisition request with the first message authentication code to the target device,
the target device is configured to generate a second message authentication code based on the count value of the stopped counter if the attack information acquisition request with the first message authentication code is received from the collection device and to determine whether or not the first message authentication code and the second message authentication code coincide with each other,
the target device is configured such that, in a case where the first message authentication code and the second message authentication code coincide with each other, the target device determines that the target device is normal, the target device transmits the attack information to the collection device, and the target device starts the operation of the counter to end the test mode, and
the target device is configured such that, in a case where the first message authentication code and the second message authentication code do not coincide with each other, the target device determines that the target device is not normal and the target device starts the operation of the counter to end the test mode.

* * * * *